United States Patent
Kim

[19]

[11] Patent Number: 5,982,433
[45] Date of Patent: Nov. 9, 1999

[54] DATA COMPRESSION AND DISPLAY MEMORY APPARATUS

[75] Inventor: Dong Ho Kim, Daegu, Rep. of Korea

[73] Assignee: LG Electronics Inc., Seoul, Rep. of Korea

[21] Appl. No.: 08/859,085

[22] Filed: May 20, 1997

[30] Foreign Application Priority Data

May 20, 1996 [KR] Rep. of Korea ...................... 96-17016

[51] Int. Cl.$^6$ .................................................. H04N 7/24
[52] U.S. Cl. ............................................................ 348/396
[58] Field of Search .................................... 348/384, 390, 348/391, 392, 393, 394, 395, 396, 409, 415, 424, 425

[56] References Cited

U.S. PATENT DOCUMENTS

| | | | |
|---|---|---|---|
| 4,101,926 | 7/1978 | Dischert et al. | 348/514 |
| 4,134,131 | 1/1979 | Hopkins, Jr. | 348/513 |
| 4,173,771 | 11/1979 | Iijima | 348/409 |
| 5,841,479 | 11/1998 | Van Gestel | 348/432 |

*Primary Examiner*—Bryan Tung
*Attorney, Agent, or Firm*—Finnegan, Henderson, Farabow, Garrett & Dunner, L.L.P.

[57] ABSTRACT

A data compression and display memory apparatus which is capable of obtaining a better compression efficiency by using a DPCM and a line interpolation technique and providing a simple hardware construction. The apparatus includes a DPCM and quantization unit for quantizing 8-bit luminance signal Y and chrominance signal C, which is an ODD field signal, in accordance with a clock signal CK1 from the control signal generator for thus outputting 4-bit luminance signal Y and chrominance signal C, a bit converter for converting quantized 4-bit luminance signal Y and chrominance signal into 8-bit, respectively, a memory for storing an output from the bit converter in accordance with read/write signals RD and WR from the control signal generator, a bit converter for converting 8-bit luminance signal Y and chrominance signal C from the memory into 4-bit, respectively, a reverse DPCM and dequantization unit for reverse-DPCM-processing and dequantizing an output from the bit converter in accordance with the clock signal CK1 and outputting an ODD field signal, an interpolation unit for generating an EVEN field signal from the ODD field signal from the reverse DPCM and dequantization unit in accordance with the clock signal CK1, and a multiplexor for multiplexing the ODD field signal and EVEN field signal in accordance with a control signal CT from the control signal generator and outputting 8-bit luminance signal Y and chrominance signal C.

12 Claims, 11 Drawing Sheets

FIG. 7
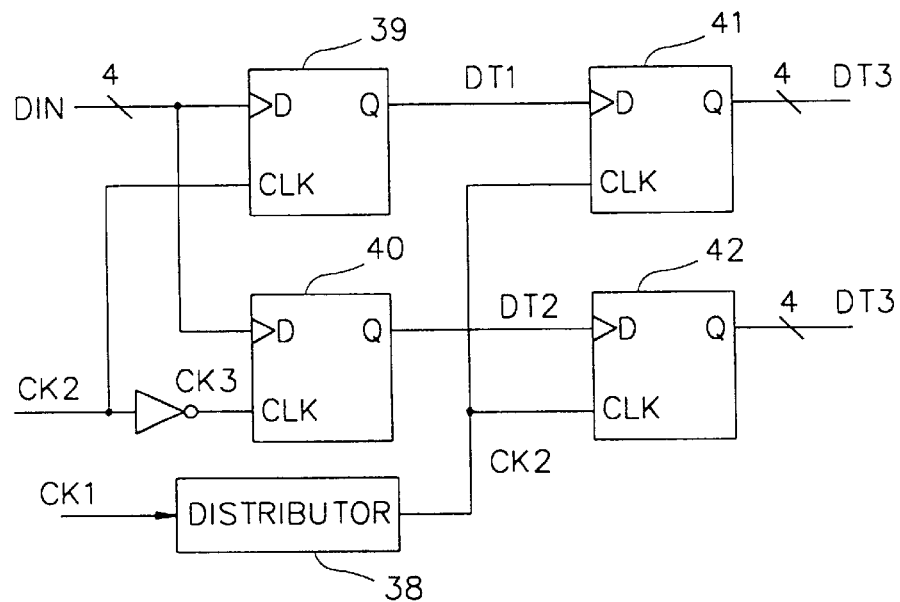
FIG. 8A CK1 
FIG. 8B DIN 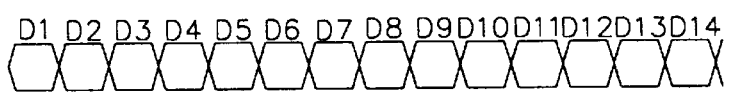
FIG. 8C DT1 
FIG. 8D DT2 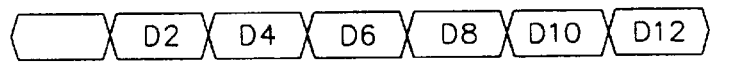
FIG. 8E DT3 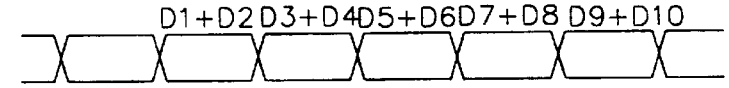
FIG. 8F CK2 
FIG. 8G CK3 
FIG. 8H CK4 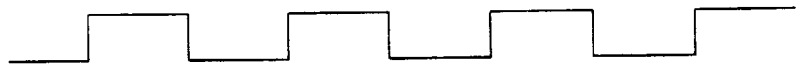

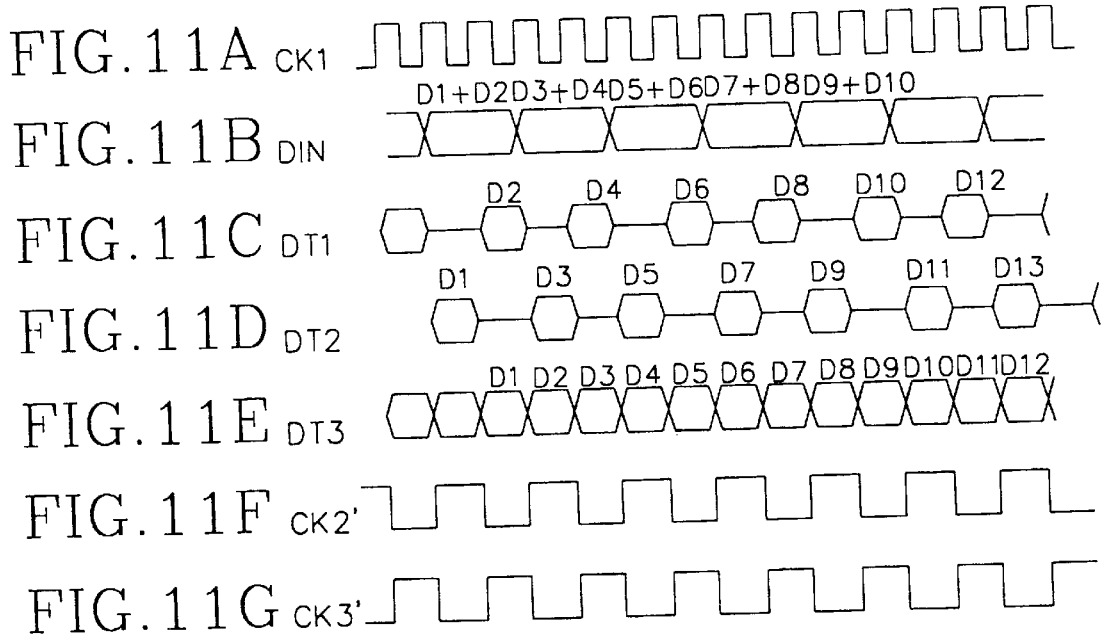
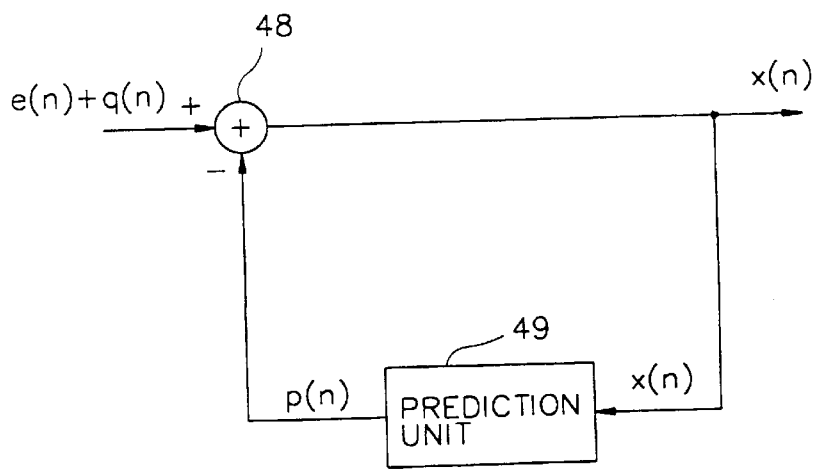
FIG. 12

DATA COMPRESSION AND DISPLAY MEMORY APPARATUS

BACKGROUND OF THE INVENTION

1. Field of the Invention

The present invention relates to a data compression and display memory apparatus, and in particular to an improved data compression and display memory apparatus which is capable of providing a desired compression ratio by using a differential pulse code modulation and line interpolation technique for thus simplifying the construction of the apparatus.

2. Description of the Conventional Art

The image compression technique is widely used. In the field of a television broadcast system, the image compression technique is used for transmitting an image data using a direct broadcast satellite (DBS) system.

As the technique, there is known an MPEG II. The MPEG II is capable of obtaining a high compression ratio of an image data and a high resolution image compared to other image compression techniques.

In addition, the image compression technique is further used for storing a part of television image data using a storing apparatus installed in a television set. Among the techniques, there is known a compression technique of a wavelet method used for a television system with a playback apparatus (Matsusita Co.).

However, the wavelet method has a good compression ratio but requires a floating operation since the same needs a multiple resolution technique, for thus causing a complicated hardware.

In addition, the differential pulse code modulation (DPCM) technique is directed to eliminating a redundancy component which exists in a neighboring pixel of a video signal and then compressing video signals. This compression technique does not have a desired compression ratio. However, the construction of the same is simple, so that the compression technique is used in various fields.

The method for compressing the data using the DPCM is disclosed in U.S. Pat. No. 4,173,771, and the method for converting the input data and the reading/writing the data from/into the memory is disclosed in U.S. Pat. Nos. 4,101, 926 and 4,134,131.

FIG. 1 illustrates a conventional video signal capture system.

As shown therein, the conventional video signal capture system includes a synchronous separator 11 for separating a synchronous signal from a video signal, a clock signal generator 12 for generating a clock signal in accordance with a synchronous signal from the synchronous separator 11, an analog/digital (A/D) converter 13 for digitally converting a video signal inputted, an interleaver 14 for interleaving the digital data from the AND converter 13 by the line unit in accordance with the synchronous signal from the synchronous separator 11, a prediction encoder 15 for prediction-coding the output from the interleaver 14 and for outputting the output to a transmission channel, a timing signal separator 16 for separating a timing signal from the prediction-coded data from the transmission channel, a clock signal generator 17 for generating a clock signal in accordance with a timing signal from the timing signal separator 16, a prediction decoder 18 for decoding the prediction-coded data inputted through the transmission channel, a reverse interleaver 19 for reversely interleaving the output from the prediction decoder 18, and a digital/analog (D/A) converter 20 for converting the output from the reverse interleaver 19 into an analog video signal.

Here, the clock signal from the clock signal generator 12 having a sample frequency fs is inputted into the A/D converter 13, the interleaver 14, and the prediction encoder 15, respectively, and the clock signal from the clock signal generator 17 having the sample frequency fs is inputted into the prediction decoder 18, the reverse interleaver 19, and the D/A converter 20, respectively.

The operation of the conventional video signal capture system will now be explained with reference to FIG. 1.

When a video signal is inputted, the synchronous separator 11 separates a synchronous signal (a horizontal or vertical synchronous signal) from the video signal and outputs the signal to the clock signal generator 12 and the interleaver 14, and the clock signal generator 12 generates a clock signal in synchronization with the synchronous signal and then outputs the signal to the A/D converter 13, the interleaver 14, and the prediction encoder 15, respectively.

As a result, the video signal inputted is converted into the digital video signal by the A/D converter 13, and then is interleaved by the line unit by the interleaver 14. The interleaved data is coded by the prediction encoder 15, and is outputted to the transmission channel. At this time, the interleaver 14 performs a line delay which is needed for a prediction encoding and mixes two lines as one line.

In addition, the prediction-coded data from the transmission channel is processed in the reverse sequence of the above-described process, and then is demodulated into a video signal.

Namely, the timing signal separator 16 separates a timing signal from the prediction-coded data from the transmission channel and then outputs the signal to the clock generator 17 and the reverse interleaver 19, respectively, and the clock signal generator 17 generates a clock signal in accordance with the timing signal and then outputs the signal to the prediction decoder 18, the reverse interleaver 19, and the D/A converter 20, respectively.

Therefore, the prediction-coded data from the transmission channel is decoded by the prediction decoder 18, and the thusly decoded data is reversely interleaved by the reverse interleaver 19 and then is analog-converted by the D/A converter 20 and is outputted as a video signal. At this time, the reverse interleaver 19 changes the data in which two lines are mixed to an original state.

However, since the conventional video signal capture system uses simples the differential pulse code modulation (DPCM), the compression efficiency is significantly decreased.

SUMMARY OF THE INVENTION

Accordingly, it is an object of the present invention to provide a data compression and display memory apparatus which overcomes the aforementioned problem encountered in the conventional art.

It is another object of the present invention to provide an improved data compression and display memory apparatus which is capable of obtaining a better compression efficiency by using a DPCM and a line interpolation technique and providing a simple hardware construction.

To achieve the above objects, there is provided a data compression and memory apparatus according to a first embodiment of the present invention, which includes a synchronous separator for separating a synchronous signal and a field signal from a luminance signal Y, a control signal generator for performing a control operation in accordance with an output from the synchronous separator, a DPCM and quantization unit for quantizing 8-bit luminance signal Y and chrominance signal C, which is an ODD field signal, in accordance with a clock signal CK1 from the control signal generator for thus outputting 4-bit luminance signal Y and chrominance signal C, a bit converter for converting quantized 4-bit luminance signal Y and chrominance signal into 8-bit, respectively, a memory for storing an output from the bit converter in accordance with read/write signals RD and WR from the control signal generator, a bit converter for converting 8-bit luminance signal Y and chrominance signal C from the memory into 4-bit, respectively, a reverse DPCM and dequantization unit for reverse-DPCM-processing and dequantizing an output from the bit converter in accordance with the clock signal CK1 and outputting an ODD field signal, an interpolation unit for generating an EVEN field signal from the ODD field signal from the reverse DPCM and dequantization unit in accordance with the clock signal CK1, and a multiplexor for multiplexing the ODD field signal and EVEN field signal in accordance with a control signal CT from the control signal generator and outputting 8-bit luminance signal Y and chrominance signal C.

To achieve the above objects, there is provided a data compression and memory apparatus according to a second embodiment of the present invention, which includes a synchronous separator for separating a synchronous signal and a field signal from a luminance signal Y, a control signal generator for performing a control operation in accordance with an output from the synchronous separator, a DPCM and quantizaton unit for quantizing 8-bit luminance signal Y and chrominance signal C, which is an ODD field signal, in accordance with a clock signal CK1 from the control signal generator for thus outputting 4-bit luminance signal Y and chrominance signal C, a bit converter for converting quantized 4-bit luminance signal Y and chrominance signal into 8-bit, respectively, a memory for storing an output from the bit converter in accordance with read/write signals RD and WR from the control signal generator, a bit converter for converting 8-bit luminance signal Y and chrominance signal C from the memory into 4-bit, respectively, a reverse DPCM and dequantization unit for reverse-DPCM-processing and dequantizing an output from the bit converter in accordance with the clock signal CK1 and outputting an ODD field signal, an interpolation unit for generating an EVEN field signal from the ODD field signal from the DPCM and dequantization unit in accordance with the clock signal CK1, a multiplexor for multiplexing the ODD field signal and EVEN field signal in accordance with a control signal CT from the control signal generator and outputting 8-bit luminance signal Y and chrominance signal C, and a reverse DPCM unit for reverse-DPCM-processing a differential signal from the multiplexor and outputting 8-bit luminance signal Y and chrominance signal C.

To achieve the above objects, there is provided a data compression and memory apparatus according to a third embodiment of the present invention, which includes horizontal and vertical decimation units for decimating sampled 8-bit luminance signal Y and chrominance signal C twice in the horizontal direction and triple in the vertical direction for being adapted to a PIP mode, a horizontal decimation unit for twice decimating outputs from the horizontal and vertical decimation units in the horizontal direction, a synchronous separator for separating a synchronous signal and a field signal from a luminance signal Y, a control signal generator for performing a control operation in accordance with an output from the synchronous separator, a DPCM and quantization unit for quantizing 8-bit luminance signal Y and chrominance signal C, which is an ODD field signal, in accordance with a clock signal CK1 from the control signal generator for thus outputting 4-bit luminance signal Y and chrominance signal C, a bit converter for converting quantized 4-bit luminance signal Y and chrominance signal into 8-bit, respectively, a memory for storing an output from the bit converter in accordance with read/write signals RD and WR from the control signal generator, a bit converter for converting 8-bit luminance signal Y and chrominance signal C from the memory into 4-bit, respectively, a reverse DPCM and dequantization unit for reverse-DPCM-processing and dequantizing an output from the bit converter in accordance with the clock signal CK1 and outputting an ODD field signal, an interpolation unit for generating an EVEN field signal from the ODD field signal from the reverse DPCM and dequantization unit in accordance with the clock signal CK1, and a multiplexor for multiplexing the ODD field signal and EVEN field signal in accordance with a control signal CT from the control signal generator and outputting 8-bit luminance signal Y and chrominance signal C.

To achieve the above objects, there is provided a data compression and memory apparatus according to a fourth embodiment of the present invention, which includes a horizontal and vertical decimation unit for twice decimating a sampled 8-bit luminance signal Y and chrominance signal C in the horizontal direction and triple decimating the same in the vertical direction, a horizontal decimation unit for twice decimating an output from the vertical decimation unit in the horizontal direction, a DPCM and coding unit for performing a DPCM with respect to an output from the horizontal decimation unit and coding the data into a 4-bit data, a bit converter for converting an output from the DPCM and coding unit into an 8-bit data, a memory for storing an output from the bit converter, a bit converter for converting an 8-bit data from the memory into a 4-bit data, a reverse DPCM and coding unit for performing a reverse DPCM with respect to an output from the bit converter and coding the same, a horizontal and vertical interpolation unit for receiving an output from the reverse DPCM and coding unit, performing a horizontal and vertical axis interpolation with respect to the horizontal and vertical decimation, and outputting a luminance signal Y and chrominance signal C of an ODD field, an EVEN field generation unit for vertically interpolating an output from the horizontal and vertical interpolation unit and generating an EVEN field, and a multiplexor for multiplexing an ODD field from the horizontal and vertical interpolation unit and an EVEN field from the EVEN field generation unit and outputting an 8-bit luminance signal Y and chrominance signal C.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a detailed diagram illustrating a bit converter (4-bit to 8-bit) in the circuit of FIG. 2 according to the present invention;

FIGS. 8A through 8H are timing waveform diagrams of input/output signals from a bit converter in the circuit of FIG. 7 according to the present invention;

FIGS. 11A through 11G are timing waveform diagrams of input/output signals in the circuit of FIG. 10;

FIG. 12 is a diagram illustrating the construction of a reverse DPCM according to the present invention;

DETAILED DESCRIPTION OF THE INVENTION

Figure 1:
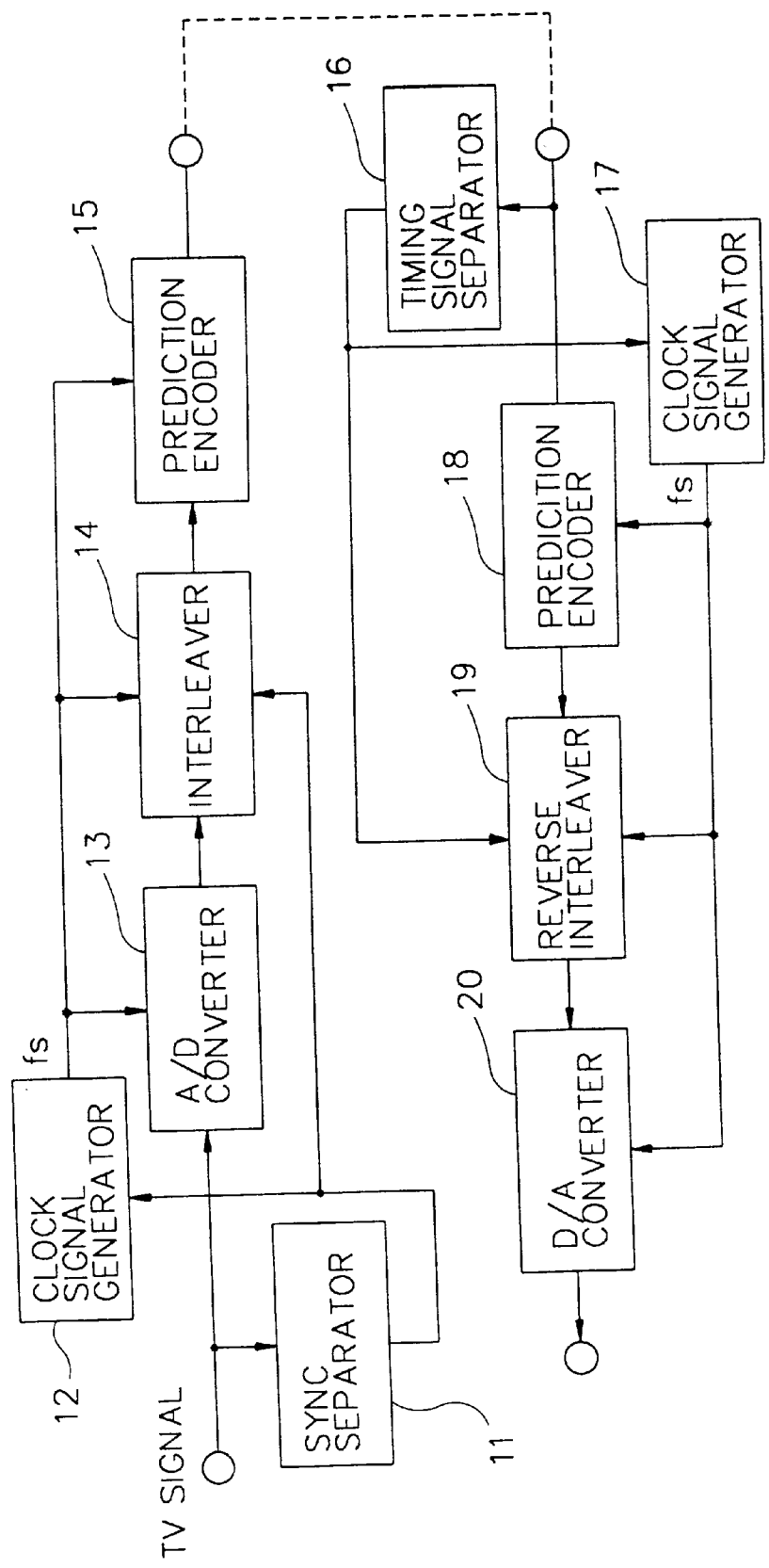
FIG. 1 is a block diagram illustrating a conventional video signal capture system.
Figure 2:
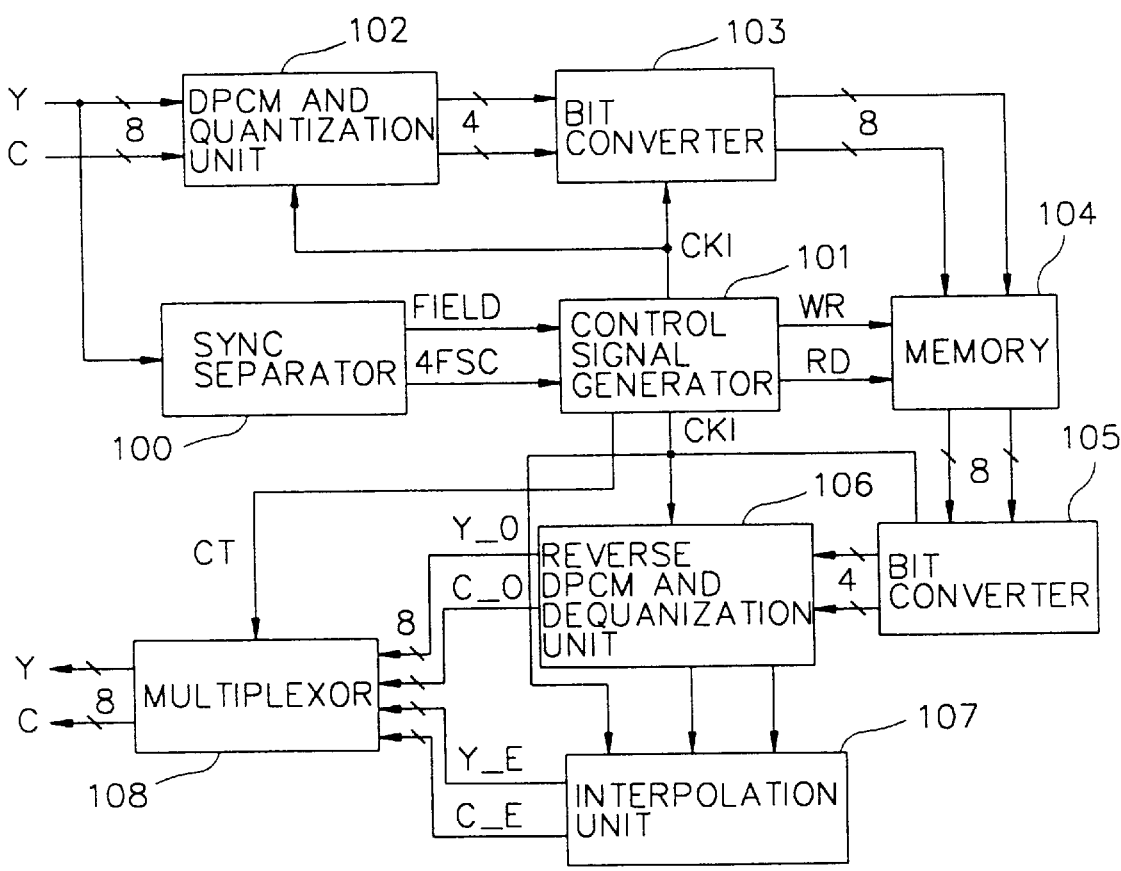
FIG. 2 is a block diagram illustrating a data compression and display memory apparatus according to the present invention.

FIG. 2 illustrates a data compression and display memory apparatus according to the present invention.

As shown therein, the data compression and display memory apparatus according to the present invention includes a synchronous separator 100 for separating synchronous and field signals from a luminance signal Y, a control signal generator 101 for performing a control operation in accordance with separated synchronous and field signals, a DPCM and quantization unit 102 for quantizing an ODD field signal of an 8-bit luminance signal Y and chrominance signal C into a 4-bit signal in the DPCM method in accordance with a clock signal CK1 from the control signal generator 101, a bit converter 103 for converting the quantized 4-bit luminance signal Y and chrominance signal C into 8-bit, respectively, a memory 104 for storing the output from the bit converter 103 in accordance with read/write signals RD, WR from the control signal generator 101, a bit converter 105 for converting 8-bit luminance signal Y and chrominance signal C from the memory 104 into 4-bit, respectively, a reverse DPCM and dequantization unit 106 for dequantizing the output from the bit converter 105 in accordance with the clock signal CK1 from the control signal generator 101 and outputting an ODD field signal, an interpolation unit 107 for generating an EVEN field signal based on the ODD field signal from the reverse DPCM and dequantization unit 106 in accordance with the clock signal CK1 from the control signal generator 101, and a multiplexor 108 for multiplexing the ODD signal and EVEN field signal and outputting 8-bit luminance signal Y and chrominance signal C.

The operation of the video signal capture system according to the present invention will now be explained.

Figure 3:
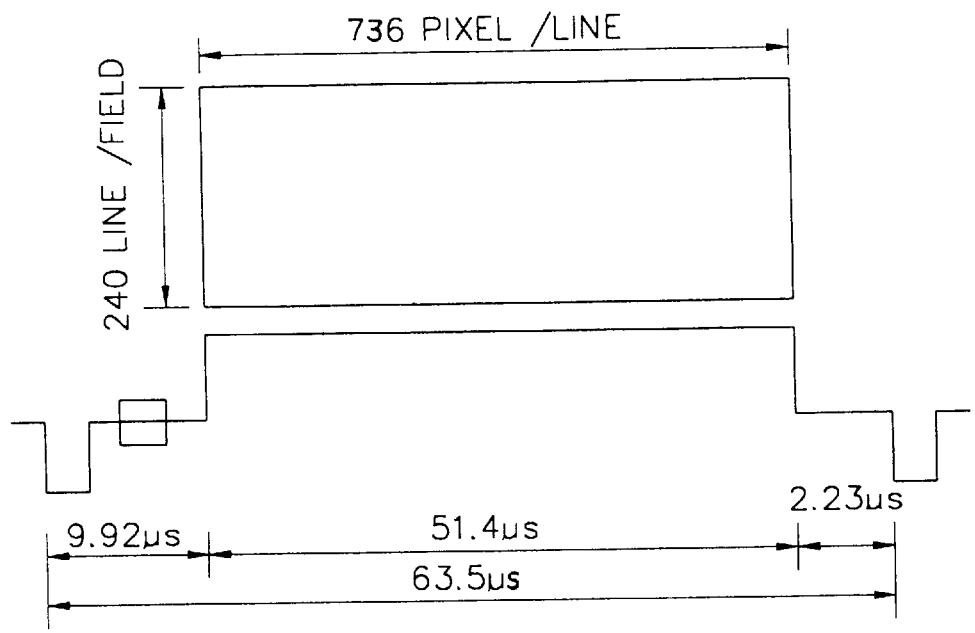
FIG. 3 is a diagram illustrating a processing unit of an image data.

First, the processing unit of the image data is 228(line/field×672(pixel/line) as shown in FIG. 3.

When 8-bit luminance signal Y and chrominance signal C are inputted, the synchronous separator 100 separates a synchronous signal from the luminance signal Y, and outputs $4f_{sc}$ clock frequency and field signal, and the control signal generator 101 outputs a clock signal CK1, a read signal Rd, and a write signal WR in accordance with the synchronous signal and clock frequency, and the DPCM and quantization unit 102 twice compresses the luminance signal Y and chrominance signal C of the ODD field in accordance with the clock signal CK1 by using the DPCM and through the quantization process and then outputs 4-bit luminance signal Y and chrominance signal C.

Thereafter, the bit converter 103 converts 4-bit luminance signal Y and chrominance signal C into 8-bit in accordance with the clock signal CK1 for accessing the memory 104 in which the data is inputted/outputted by the 8-bit unit and stores 8-bit luminance signal Y and chrominance signal C into the memory 104 in accordance with the write signal WR from the control signal generator 101. At this time, the clock signal CK1 becomes quadruple ($4f_{sc}$:14.3 Mhz) of the color sub-carrier frequency of about 3.58 Mhz.

In addition, when 8-bit luminance signal Y and chrominance signal C are outputted from the memory 104 in accordance with the read signal RD from the control signal generator 101, the bit converter 105 converts 8-bit luminance signal Y and chrominance signal C into 4-bit luminance signal Y and chrominance signal C and then outputs the signals to the reverse DPCM and dequantization unit 106.

Thereafter, the reverse DPCM and dequantization unit 106 dequantizes 4-bit luminance signal Y and chrominance signal C inputted and outputs 8-bit luminance signal Y-O of the ODD field and chrominance signal C-O of the ODD field through the reverse DPCM, and the interpolation unit 107 line-interpolates the luminance signal Y-O and chrominance signal C-O of the ODD field and generates a luminance signal Y-E and chrominance signal C-E of 8-bit EVEN field.

Therefore, the multiplexor 108 alternately selects luminance signal Y-E and chrominance signal C-E of the ODD field and EVEN field in accordance with the clock signal CK1 and outputs 8-bit luminance signal Y and chrominance signal C.

The operation of the data compression and display memory apparatus according to the present invention will now be explained in detail.

Figure 4:
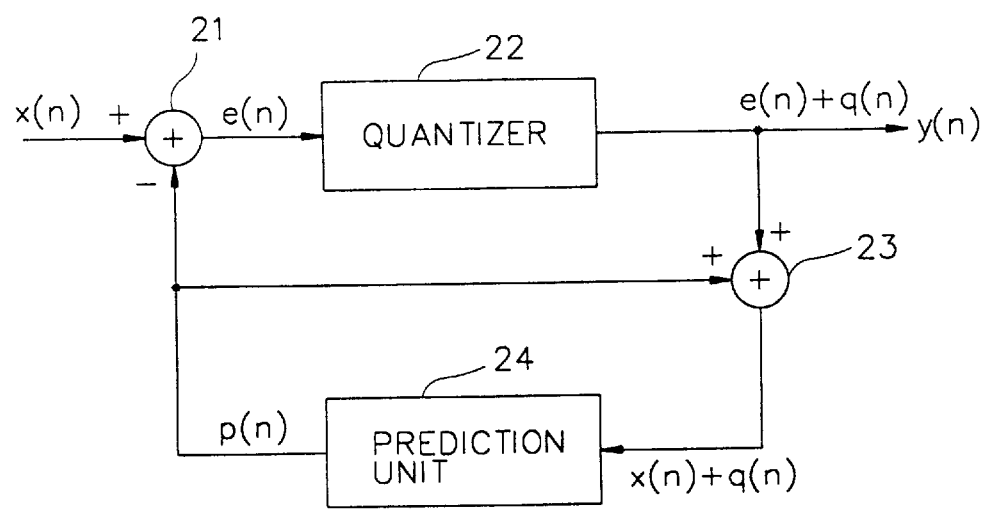
FIG. 4 is a diagram illustrating the construction of a differential pulse code modulation according to the present invention.

The DPCM is implemented by the hardware as shown in FIG. 4.

The DPCM and quantization unit 102 quantizes the luminance signal Y and chrominance signal C of the ODD field in accordance with the clock signal CK1, and codes the quantized signals.

Thereafter, a subtractor 21 performs a subtraction with respect to the prediction value p(n) which is obtained by multiplying a prediction error value by a proper weight and the coded input signal x(n), and the subtracted value e(n) is quantized by the quantizer 22.

The quantizer 22 is formed by simply using the ROM of 256×8 bit, and receives the subtracted value e(n) as an address and outputs a quantization value matching with the address value.

For example,
(101a), 255>e(n)>63=72→0111
(101b), 63>e(n)>29=45→0110
(101c), 29>e(n)>21=24→0101
(101d), 21>e(n)>15=17→0100
(101e), 15>e(n)>10=12→0011
(101f), 10>e(n)>6=8→0010
(101g), 6>e(n)>3=4→0001
(101h), 3>e(n)>1=2→0000
(101i), 0.1=0→0000
(101j), −255>e(n)>−62=−71→1111
(101k), −62>e(n)>−28=−44→1110
(101l), −28>e(n)>−20=−23→1101
(101m), −20>e(n)>−14=−16→1100
(101n), −14>e(n)>−9=−11→1011
(101o), −9>e(n)>−5=−7→1010
(101p), −5>e(n)>−2=−3→1001

Namely, the subtracted value e(n) is within 255 and 63, the value e(n) is quantized and the becomes 72, and is expressed as "0111".

Therefore, the output signal y(n) is obtained by summing the quantization error value q(n) which is obtained by quantizing the subtracted value e(n). The above-describe process may be expressed as follows.

(102a), y(n)=e(n)+q(n)
(102b), p(n)=x(n−L−1)+q(n−L+1)/2+(x(n−L)+q(n−L)+x(n−L+1)+q(n−L+1))/4
(102c), e(n)=x(n)−p(n)
(102d), q(n)=Q[e(n)]−e(n)

Figure 5:
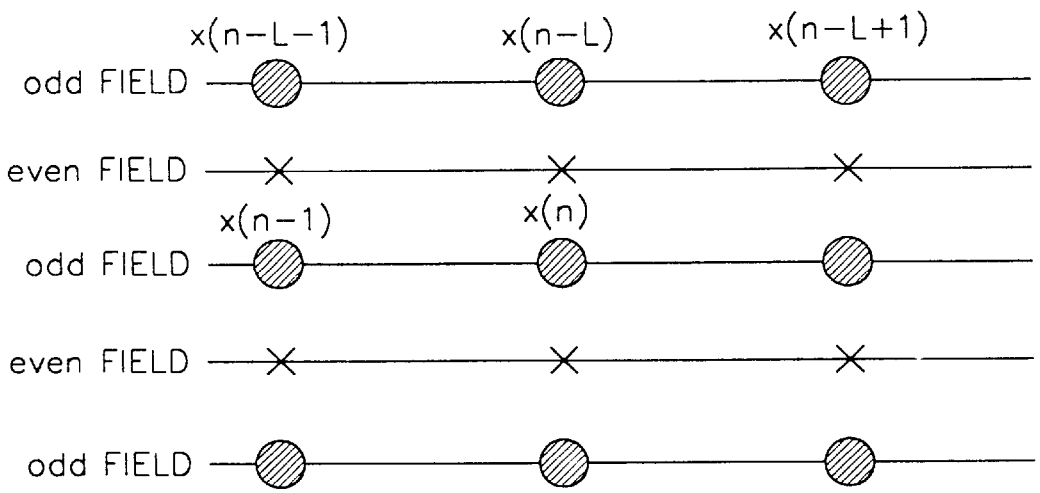
FIG. 5 is a diagram illustrating a prediction input position of a data in the circuit of FIG. 4 according to the present invention.

At this time, the value Q[e(n)] in Expression 102d is the quantization value of the subtracted value e(n), and L in Expression 102b denotes a line delay, and x(n−L−1), x(n−L), x(n−L+1) denote the input values at the prediction positions as shown in FIG. 5.

Figure 6:
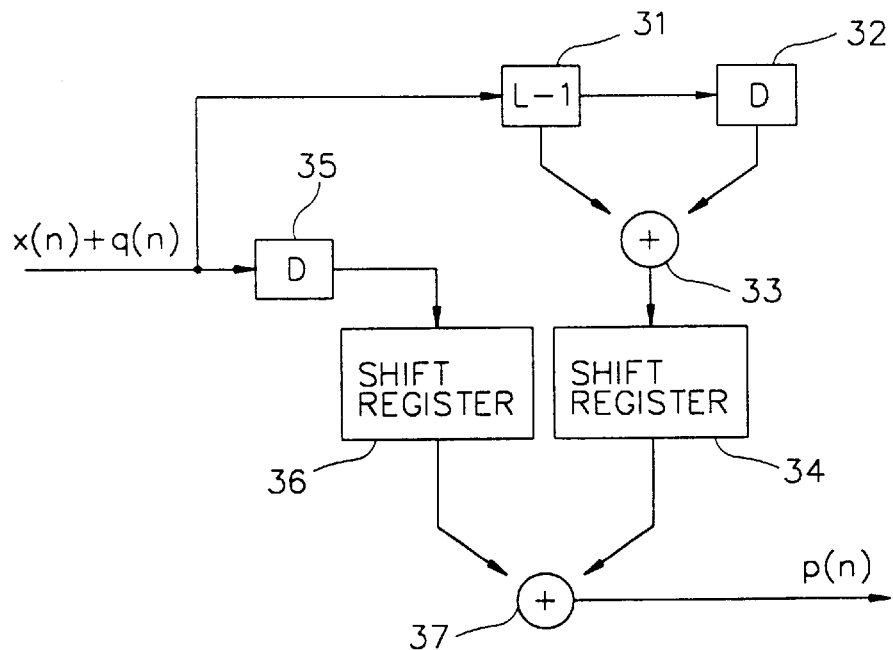
FIG. 6 is a detailed diagram illustrating a prediction unit in the circuit of FIG. 4 according to the present invention.

In addition, as shown in FIG. 6, the adder 33 adds the input signal x(n)+q(n) through the line delay unit 31 and the sampled and delayed input signals x(n)+q(n) through the line delay unit 31 and the delay unit 32, and the shift register 34 eliminates a least significant bit (LSB) and the next LSB from the addition signal and outputs a value which is obtained by dividing the input signal x(n)+q(n) by 4.

In addition, since the LSB is eliminated from the input signal x(n)+q(n), which is sampled and delayed by the delay unit 35, by the shift register 36, a value is obtained by dividing the input signal x(n)+q(n) by 2. As a result, the adder 37 adds the outputs from the shift registers 34 and 36 and outputs a prediction value p(n).

Thereafter, when the DPCM is completed, the DPCM and quantization unit 102 codes the output signal y(n) from the quantizer 22, and the value from the quantizer 22 is 8-bit, but is fixed to one value of 16 values. This value may be expressed in the 4-bit.

Therefore, as expressed in Expressions 101a through 101p, 8-bit output signal y(n) from the quantizer 22 is converted into 4-bit by a logic-for-converter (not shown) and is used as an address of the 16×4 bit memory (not shown), so that coded 4-bit luminance signal Y and chrominance signal C matching with the address from the memory (not shown) are outputted.

Through the above-described processes, when the 4-bit luminance signal Y and chrominance signal C are outputted from the DPCM and quantization unit 102, the bit converter 103 converts the data into 8-bit unit data in accordance with the clock signal CK1 from the control signal generator 101, and the data are written into the memory 104.

Namely, as shown in FIG. 7, when the distributor 38 divides the clock signal CK1 having a clock frequency of $4f_{sc}$ as shown in FIG. 8A, and outputs a clock signal CLK2 as shown therein, the flip-flop units 39 and 40 latch the input data DIN as shown in FIG. 8B in accordance with the clock signal CLK2 or an inverter clock signal CLK3, and output data DT1 and DT2 as shown in FIGS. 8C and 8D, and the flip-flop units 41 and 42 latch 4-bit data DT1 and DT2 from the flip-flop units 39 and 40 in accordance with the clock signal CLK2, and then outputs data DT3 as shown in FIG. 8E.

Therefore, the memory 104 writes 8-bit luminance signal Y and chrominance signal C from the bit converter 103 in accordance with a write signal WR from the control signal generator 101.

Figures 9A, 9B, 9C, 9D, 9E, 9F, 10:
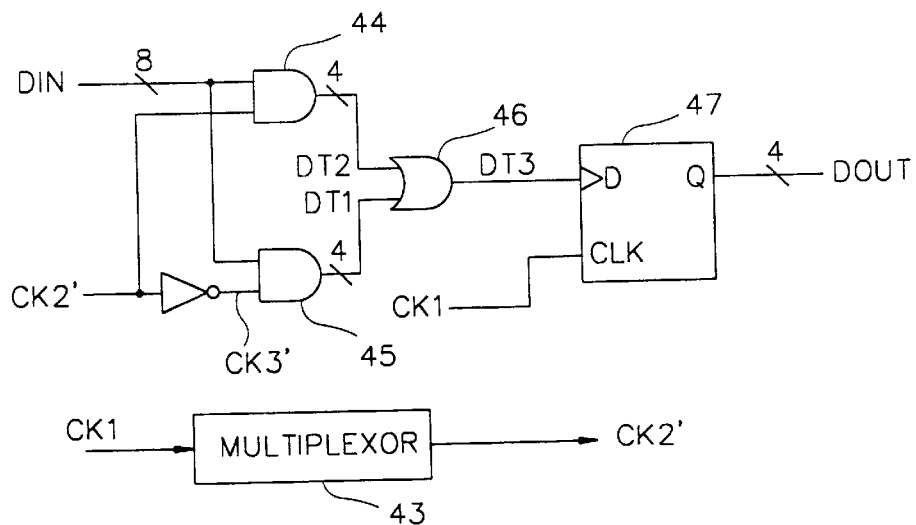
FIGS. 9A through 9F are timing waveform diagrams of signals from a memory in the circuit of FIG. 3 according to the present invention.
FIG. 10 is a detailed diagram illustrating a bit converter (8-bit to 4-bit) in the circuit of FIG. 2 according to the present invention.

At this time, the control signal generator 101 receives a field signal from the synchronous separator 100 as shown in FIG. 9A and outputs a write signal WR for processing data of 240 line×iH(736 pixel/line), as shown in FIG. 3, during the selection interval of the ODD field as shown in FIG. 9B.

In addition, in the read operation mode, the memory 104 writes the previously stored 8-bit luminance signal Y and chrominance signal C in accordance with the read signal RD, as shown in FIG. 9E, from the control signal generator 101 during the selection interval of the ODD field.

Thereafter, the bit converter 105 converts the 8-it luminance signal Y and chrominance signal C read from the memory 104 into 4-bit luminance signal Y and chrominance signal C in accordance with the clock signal CK1 from the control signal generator 101 and outputs the signals to the reverse DPCM and dequantization unit 106.

Namely, as shown in FIG. 10, when the multiplier 43 multiplies the clock signal CK1 having a clock frequency of $4f_{sc}$ as shown in FIG. 11A and outputs a clock signal CK2' as shown in FIG. 11F, the NAND-gates 44 and 45 output the data DT1 and DT2 as shown in FIGS. 11C and 11D from the 8-bit input data DIN as shown in FIG. 11B in accordance with the clock signal CLK2' or the inverted clock signal CLK3', and the OR-gate 46 ORs the data DT1 and DT2 and outputs a data DT3 as shown in FIG. 11E.

Therefore, the flip-flop unit 47 latches the output from the OR-gate 46 by the 4-bit in accordance with the clock signal CK1 and outputs an output DOUT.

At this time, since the data from the bit converter 105 is not the DPCM value, the reverse DPCM and dequantization unit 106 outputs 8-bit ODD data corresponding to the address by using the 4-bit data from the bit converter 105 as an address of a ROM (16×8 bit), and the value e(n)+q(n) is outputted by the decoding operation.

For example,
(103a), 0111=72
(103b), 0110=45
(103c), 0101=24
(103d), 0100=17
(103e), 0011=12
(103f), 0010=8
(103g), 0001=4
(103h), 0000=2

(103i), 0000=0
(103j), 1111=−71
(103k), 1110=−44
(103l), 1101=−23
(103m), 1100=−16
(103o), 1011=−11
(103p), 1010=−7
(103q), 1001=−3

Here, the reverse DPCM and dequantization unit 106 generates 8-bit luminance signal Y-O and chrominance signal C-O of the ODD field through a reverse DPCM block as shown in FIG. 12.

Namely, the adder 48 adds the prediction value p(n) to the value e(n)+q(n) through the decoding operation, and outputs the original signal x(n), namely, the luminance signal Y-O and chrominance signal C-O of the ODD field. The above-described process may be expressed as follows.

(104a), $x(n)=e(n)+q(n)+p(n)$
(104b), $p(n)=x(n-L-1)/2+(x(n-L)+x(n-L+1))/4$

Here, L denotes the line delay, and x(n−L−1), x(n−L), x(n−L+1) denote the input values of the prediction positions.

Figure 13:
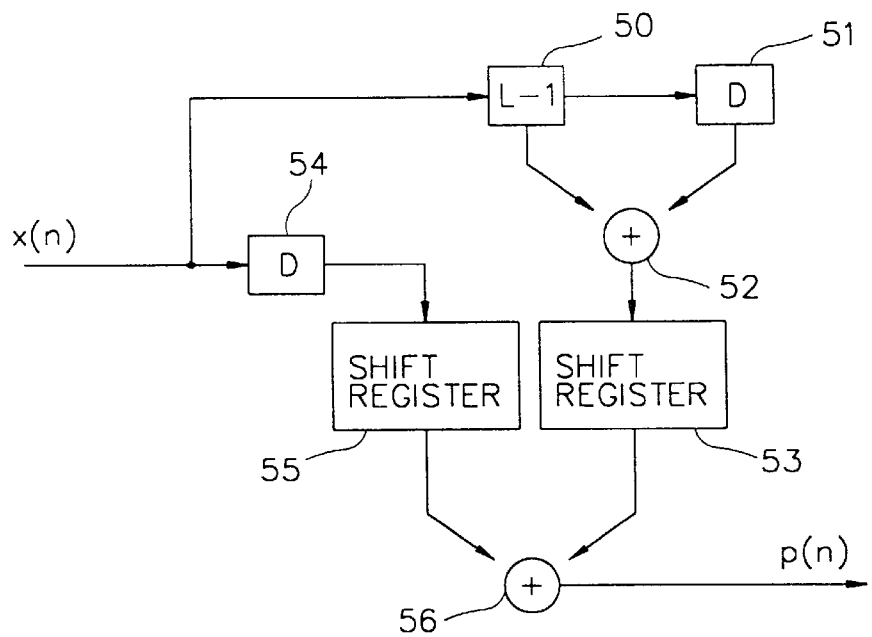
FIG. 13 is a detailed diagram illustrating a prediction unit in the circuit of FIG. 12 according to the present invention.

In addition, the construction of the prediction unit 48 as shown in FIG. 13 is configured in the same way as the prediction unit 24 as shown in FIG. 4.

The interpolation unit 107 receives luminance signal Y-O and chrominance signal C-O of the ODD field from the reverse DPCM and dequantization unit 106 and generates an EVEN field.

Figure 14:
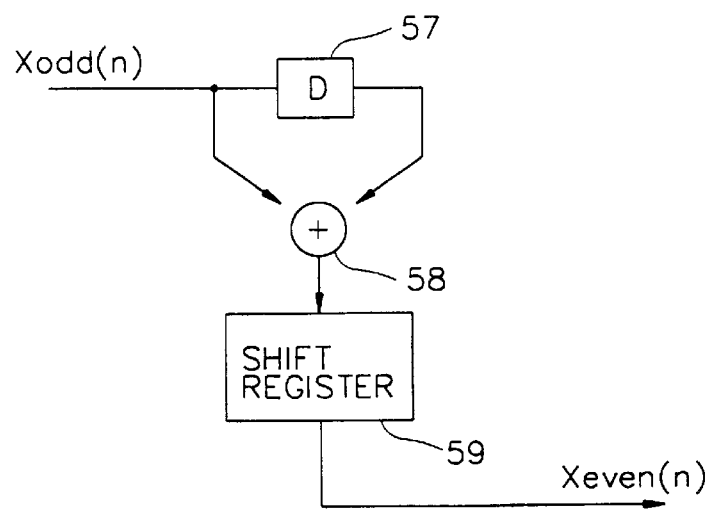
FIG. 14 is a diagram illustrating an interpolation unit in the circuit of FIG. 2 according to the present invention.

Namely, as shown in FIG. 14, when the luminance signal Y-O and chrominance signal C-O of the ODD field, namely, the signal Xodd(n), are inputted from the reverse DPCM and dequantization unit 106, the adder 58 adds the signal Xodd (n−L) sampled and delayed by the delay unit 57 and the signal Xodd(n), and the shift register 59 outputs a value which is obtained by eliminating the LSB and the next LSB from the addition signal and by dividing the remaining value by 4 for thus generating an EVEN field signal Xeven. The above-described process may be expressed as follows.

(105a), $Xeven=(Xodd(n)+Xodd(n-L))/4$

Figures 15A, 15B, 15C, 16:
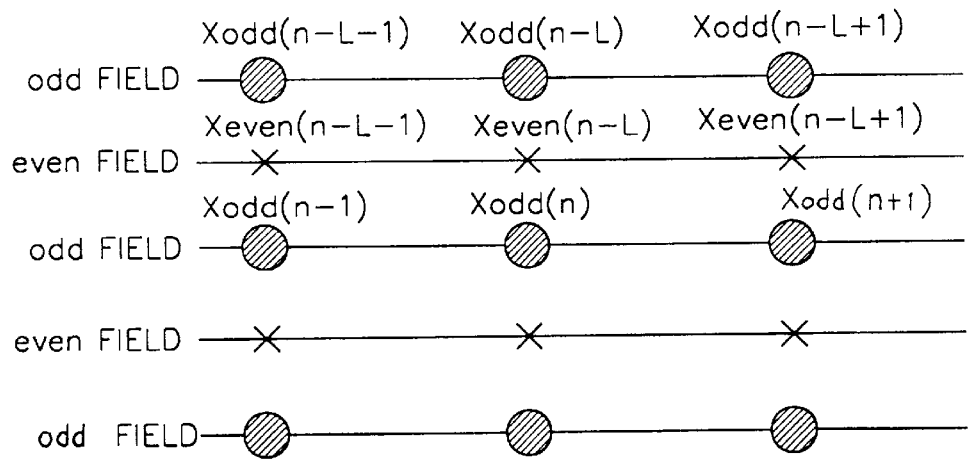
FIGS. 15A through 15C are timing waveform diagrams of input/output signals from a multiplexor in the circuit of FIG. 2 according to the present invention.
FIG. 16 is a diagram illustrating 8-bit luminance signal Y and chrominance signal C at an interpolation position and from a multiplexor according to the present invention.

Therefore, the multiplexor 108 alternately selects the signal of the ODD field from the reverse DPCM and dequantization unit 106 and the signal of the EVEN field from the interpolation unit 107 for thus outputting 8-bit luminance signal Y and chrominance signal C as shown in FIG. 16. At this time, FIG. 15C illustrates a data of one line.

In addition, since the size of the image data from the apparatus according to the present invention is defined based on the 1/9 PIP (Picture-In-Picture), the data above the resolution in the PIP mode is not used.

Therefore, the luminance signal and chrominance signal inputted into the DPCM and quantization unit 102 through the decimation process are processed triply in the vertical direction and twice in the horizontal direction for the PIP (1/9) mode.

Figure 17:
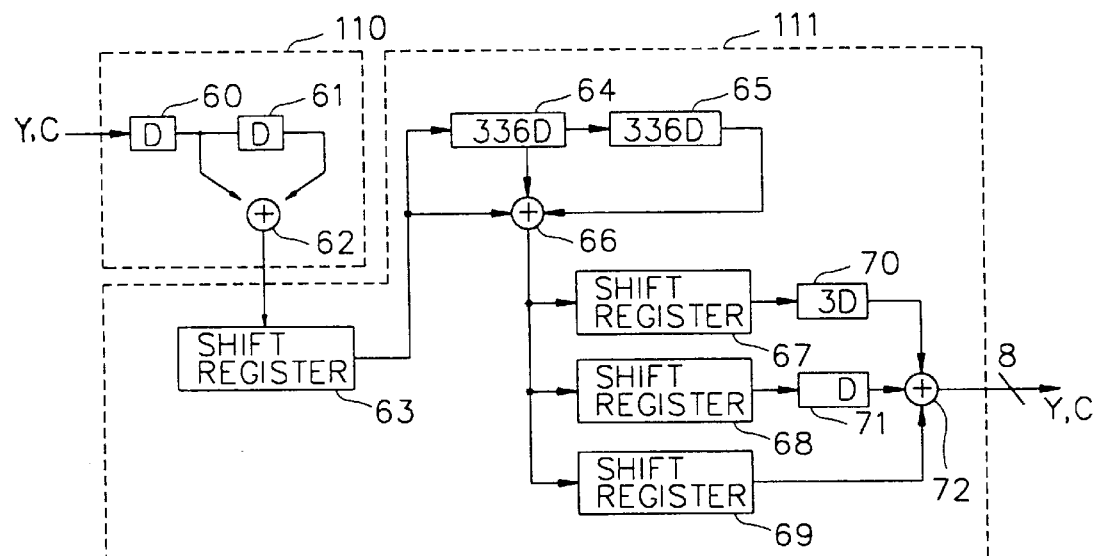
FIG. 17 is a clock signal diagram illustrating a horizontal decimation and a vertical decimation according to the present invention.

Namely, as shown in FIG. 17, the adder 62 of a horizontal decimation 110 adds the output from the delay unit 60 and the output from the delay unit 61, and the shift register 63 eliminates an LSB from the addition value and twice decimates in the direction of the horizontal axis.

In addition, the adder 66 of a vertical decimation unit 111 adds the value which is delayed by 336 pixels through the delay unit 64 and the value which is delayed by 336 pixels with respect to the output from the delay unit 64, and then the LSB is eliminated from the added value by the shift registers 67 through 69.

Therefore, the adder 72 adds the value which is delayed by 3-pixel through the shift register 67 and the delay unit 70, the value which is delayed by 1-pixel through the shift register 68, and the output value from the shift register 69, and performs a triple decimation in the direction of the vertical axis.

As a result, one line data is outputted at every third line, and a data is outputted at every another pixel of one line.

Thereafter, the double decimation process is performed in the direction of the horizontal axis by the horizontal decimation unit 112 having the same construction as the horizontal decimation unit 110. During the process, the loss of the resolution may occur in the direction of the horizontal axis. In this case, such loss problem is overcome by providing two pixel delay units and one shift register for a dividing operation.

Therefore, it is possible to increase the compression rate of the data by decreasing the amount of data inputted into the DPCM and quantization unit 102.

Figure 18:
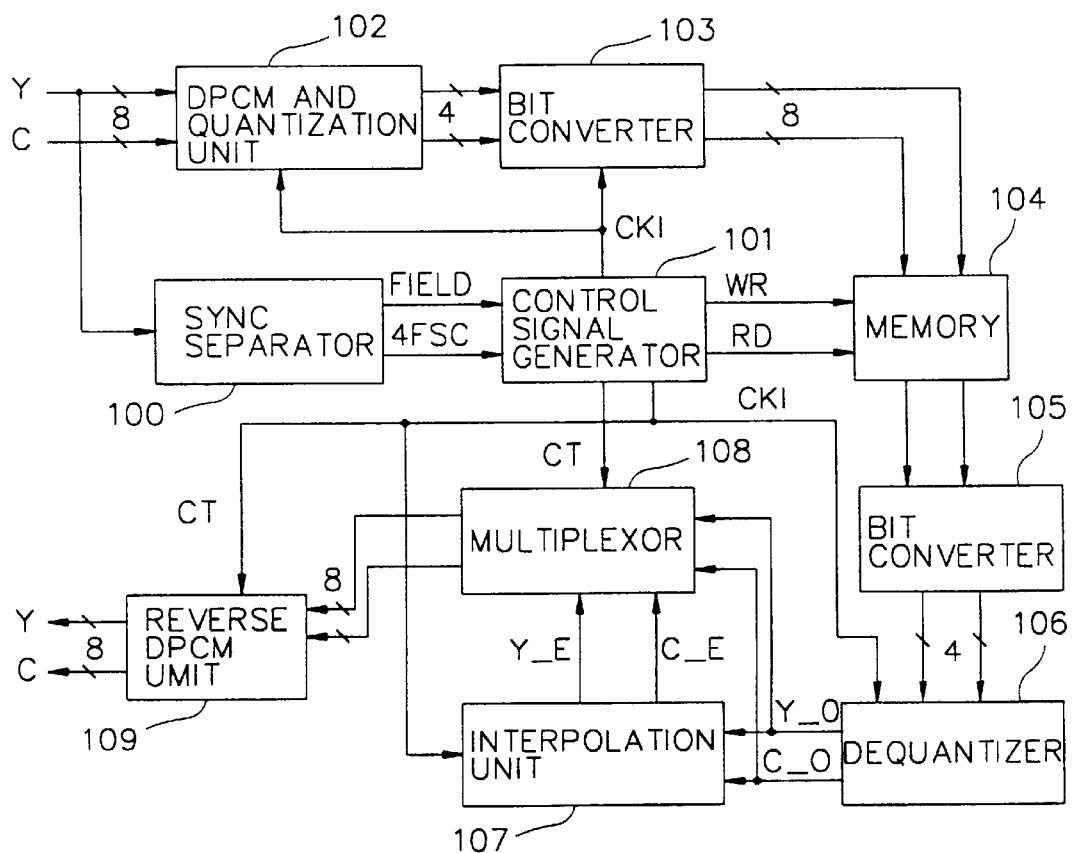
FIG. 18 is a block diagram illustrating a data compression and display memory apparatus according to another embodiment of the present invention.

FIG. 18 illustrates a data compression and display memory apparatus according to another embodiment of the present invention.

As shown therein, unlike the apparatus according to the first embodiment of the present invention, in the second embodiment of the present invention, there is further provided a reverse DPCM unit 109 for outputting 8-bit luminance signal Y and chrominance signal C through a reverse DPCM process with respect to the differential signal from the multiplexor 108 in accordance with the control of the control signal generator 101.

The construction of the data compression and display memory apparatus according to the present invention is configured in the same way as the data compression and display memory apparatus as shown in FIG. 2. In the apparatus, the differential signal for which a decoding process is not performed by the reverse DPCM and dequantization unit 106 is processed by the reverse DPCM unit 109 for thus outputting 8-bit luminance signal Y and chrominance signal C.

Figure 19:
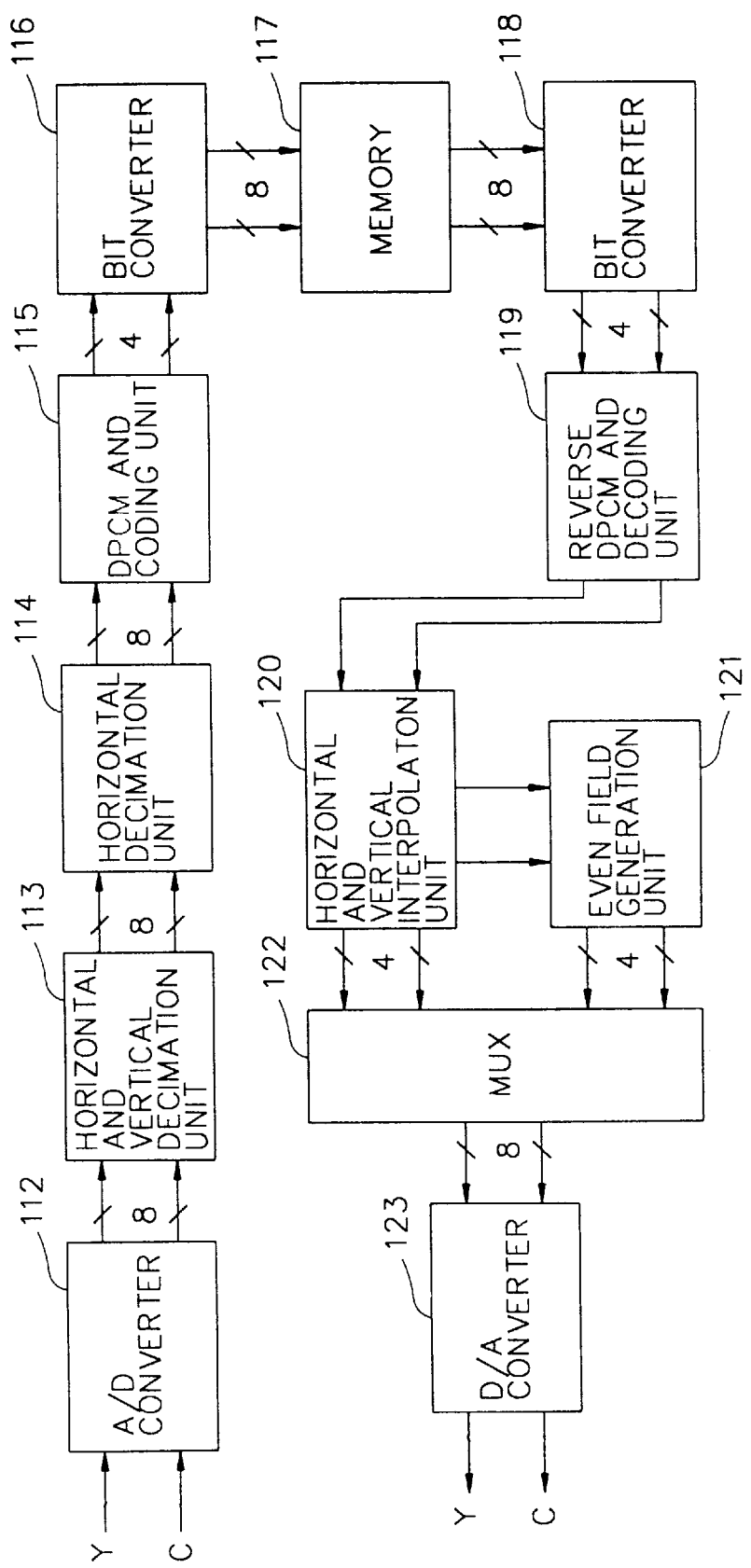
FIG. 19 is a block diagram illustrating a data compression and display memory apparatus according to another embodiment of the present invention.

FIG. 19 illustrates a data compression and display memory apparatus according to another embodiment of the present invention.

As shown therein, the data compression and display memory apparatus according to another embodiment of the present invention includes an A/D converter 112 for converting an analog luminance signal Y and chrominance signal C into 8-bit luminance signal Y and chrominance signal C, a horizontal and vertical decimation unit 113 for decimating 8-bit luminance signal Y and chrominance signal C from the A/D converter 112 for a PIP size twice in the horizontal direction and triple in the vertical direction, a horizontal decimation unit 114 for twice decimating the output from the vertical decimation unit 113 in the horizontal direction, a DPCM and coding unit 115 for performing a DPCM with respect to the output from the horizontal decimation unit 114 and coding 4-bit data, a bit converter 116 for converting the output from the DPCM and coding unit 115 into 8-bit, a memory 117 for storing the output from the bit converter 116, a bit converter 118 for converting the 8-bit data from the memory 117 into 4-bit data, a reverse DPCM and coding unit 119 for performing a reverse DPCM and coding operation with respect to the output from the bit converter 118, a horizontal and vertical interpolation unit 120 for receiving the outputs from the reverse DPCM and coding unit 119, performing a horizontal and vertical axis interpolation operation based on the horizonal and vertical decimation operation, and outputting a luminance signal Y and chrominance signal C of an ODD field, an EVEN field generator 121 for vertically interpolating the output from the horizontal and vertical interpolation unit 120 and generating an EVEN field, a multiplexor 122 for multiplexing the ODD field from the horizontal and vertical interpolation unit 120 and the EVEN field from the EVEN field generator 121 and outputting 8-bit luminance signal Y and chrominance signal C, and a D/A converter 122 for converting the output from the multiplexor into an analog signal.

Namely, the sampled 8-bit luminance signal Y and chrominance signal C from the A/D converter 112 is twice decimated in the horizontal direction and triple decimated in the vertical direction for the PIP mode, and then is twice decimated in the horizontal direction for thus decreasing the amount of data. Thereafter, the interpolation of the horizontal and vertical axis is performed with respect to the horizontal and vertical decimation.

As described above, the data compression and display memory apparatus according to the present invention is capable of concurrently using a differential pulse code modulation (DPCM) technique and a line interpolation technique for thus doubling the compression ratio compared to the conventional compression method.

In addition, the data compression and display memory apparatus according to the present invention may be used as a display memory apparatus for an image processing system such as a television set.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A data compression and display memory apparatus, comprising:
   a synchronous separator for separating a synchronous signal and a field signal from a luminance signal Y;
   a control signal generator for performing a control operation in accordance with an output from the synchronous separator;
   a DPCM (Differential Pulse Code Modulation) and quantization unit for quantizing 8-bit luminance signal Y and chrominance signal C, which is an ODD field signal, in accordance with a clock signal CK1 from the control signal generator for thus outputting 4-bit luminance signal Y and chrominance signal C;
   a bit converter for converting quantized 4-bit luminance signal Y and chrominance signal into 8-bit, respectively;
   a memory for storing an output from the bit converter in accordance with read/write signals RD and WR from the control signal generator;
   a bit converter for converting 8-bit luminance signal Y and chrominance signal C from the memory into 4-bit, respectively;
   a reverse DPCM and dequantization unit for reverse-DPCM-processing and dequantizing an output from the bit converter in accordance with the clock signal CK1 and outputting an ODD field signal;
   an interpolation unit for generating an EVEN field signal from the ODD field signal from the reverse DPCM and dequantization unit in accordance with the clock signal CK1; and
   a multiplexor for multiplexing the ODD field signal and EVEN field signal in accordance with a control signal CT from the control signal generator and outputting 8-bit luminance signal Y and chrominance signal C.

2. The apparatus of claim 1, wherein said reverse DPCM and dequantization unit includes:
   a subtractor for performing a subtraction with respect to the luminance signal Y of the coded ODD field and chrominance signal C and a prediction value p(n);
   a quantizer for quantizing an output from the subtractor;
   an adder for adding an output from the quantizer and the prediction value p(n); and
   a prediction unit for outputting a prediction value p(n) by multiplying an output from the adder and a weight.

3. The apparatus of claim 2, wherein said quantizer is formed of a ROM of 256×8-bit for thus receiving a subtracted value e(n) as an address and outputting a value matching with the address value.

4. The apparatus of claim 2, wherein said prediction unit includes:
   a line delay unit for line-delaying an output from the adder;
   a delay unit for sampling and delaying an output from the line delay unit;
   an adder for adding outputs from the line delay unit and the delay unit;
   a shift register for eliminating an LSB and the next LSB from an output from the adder;
   a delay unit for sampling and delaying an output from the adder;
   a shift register for eliminating an LSB from an output from the delay unit; and
   an adder for adding outputs from the shift registers.

5. The apparatus of claim 1, wherein said bit converter includes:
   a distributor for distributing a clock signal CK1 having a clock frequency of $4f_{sc}$ from the control signal generator;
   first flip-flop units for latching an output from the quantizer in accordance with a clock signal CK2 from the distributor; and
   second flip-flop units for latching 4-bit data from the first flip-flop units in accordance with a clock signal CLK2 and outputting 8-bit data.

6. The apparatus of claim 1, wherein said reverse DPCM and dequantization unit includes:
   an adder for adding an output from the bit converter and a prediction value p(n); and
   a prediction unit for outputting a prediction value p(n) in accordance with a value which is obtained by multiplying an output from the adder by a weight.

7. The apparatus of claim 1, wherein said interpolation unit includes:
   a delay unit for sampling and delaying an output from the reverse DPCM and dequantization unit;
   an adder for adding an output from the delay unit and an output from the reverse DPCM and dequantization unit; and
   a shift register for eliminating an LSB and the next LSB from an output from the adder and generating an EVEN field signal.

8. A data compression and display memory apparatus, comprising:
   a synchronous separator for separating a synchronous signal and a field signal from a luminance signal Y;
   a control signal generator for performing a control operation in accordance with an output from the synchronous separator;

a DPCM and quantization unit for quantizing 8-bit luminance signal Y and chrominance signal C, which is an ODD field signal, in accordance with a clock signal CK1 from the control signal generator for thus outputting 4-bit luminance signal Y and chrominance signal C;

a bit converter for converting quantized 4-bit luminance signal Y and chrominance signal into 8-bit, respectively;

a memory for storing an output from the bit converter in accordance with read/write signals RD and WR from the control signal generator;

a bit converter for converting 8-bit luminance signal Y and chrominance signal C from the memory into 4-bit, respectively;

a reverse DPCM and dequantization unit for reverse-DPCM-processing and dequantizing an output from the bit converter in accordance with the clock signal CK1 and outputting an ODD field signal;

an interpolation unit for generating an EVEN field signal from the ODD field signal from the reverse DPCM and dequantization unit in accordance with the clock signal CK1;

a multiplexor for multiplexing the ODD field signal and EVEN field signal in accordance with a control signal CT from the control signal generator and outputting 8-bit luminance signal Y and chrominance signal C; and a reverse DPCM unit for reverse-DPCM-processing a differential signal from the multiplexor and outputting 8-bit luminance signal Y and chrominance signal C.

9. A data compression and display memory apparatus, comprising:

horizontal and vertical decimation units for decimating sampled 8-bit luminance signal Y and chrominance signal C twice in the horizontal direction and triple in the vertical direction for being adapted to a PIP mode;

a horizontal decimation unit for twice decimating outputs from the horizontal and vertical decimation units in the horizontal direction;

a synchronous separator for separating a synchronous signal and a field signal from a luminance signal Y;

a control signal generator for performing a control operation in accordance with an output from the synchronous separator;

a DPCM and quantization unit for quantizing 8-bit luminance signal Y and chrominance signal C, which is an ODD field signal, in accordance with a clock signal CK1 from the control signal generator for thus outputting 4-bit luminance signal Y and chrominance signal C;

a bit converter for converting quantized 4-bit luminance signal Y and chrominance signal into 8-bit, respectively;

a memory for storing an output from the bit converter in accordance with read/write signals RD and WR from the control signal generator;

a bit converter for converting 8-bit luminance signal Y and chrominance signal C from the memory into 4-bit, respectively;

a reverse DPCM and dequantization unit for reverse-DPCM-processing and dequantizing an output from the bit converter in accordance with the clock signal CK1 and outputting an ODD field signal;

an interpolation unit for generating an EVEN field signal from the ODD field signal from the reverse DPCM and dequantization unit in accordance with the clock signal CK1; and a multiplexor for multiplexing the ODD field signal and EVEN field signal in accordance with a control signal CT from the control signal generator and outputting 8-bit luminance signal Y and chrominance signal C.

10. The apparatus of claim 9, wherein said horizontal decimation unit includes:

two delay units for delaying sampled 8-bit luminance signal Y and chrominance signal C by one pixel, respectively;

an adder for adding outputs from the delay units; and a shift register for eliminating an LSB from an output from the adder.

11. The apparatus of claim 9, wherein said vertical decimation unit includes:

two delay units for delaying an output from the horizontal decimation unit by 336 pixels;

a first adder for adding outputs from the delay units and an output from the horizontal decimation unit;

shift registers for eliminating an LSB from an output from the first adder;

a first delay unit for delaying an output from the shift register by 3-pixel;

a second delay unit for delaying an output from the shift register by one-pixel; and a second adder for adding an output from the shift register and outputs from the delay units.

12. A data compression and display memory apparatus, comprising:

a horizontal and vertical decimation unit for twice decimating a sampled 8-bit luminance signal Y and chrominance signal C in the horizontal direction and triple decimating the same in the vertical direction;

a horizontal decimation unit for twice decimating an output from the vertical decimation unit in the horizontal direction;

a DPCM and coding unit for performing a DPCM with respect to an output from the horizontal decimation unit and coding the data into a 4-bit data;

a bit converter for converting an output from the DPCM and coding unit into an 8-bit data;

a memory for storing an output from the bit converter;

a bit converter for converting an 8-bit data from the memory into a 4-bit data;

a reverse DPCM and coding unit for performing a reverse DPCM with respect to an output from the bit converter and coding the same;

a horizontal and vertical interpolation unit for receiving an output from the reverse DPCM and coding unit, performing a horizontal and vertical axis interpolation with respect to the horizontal and vertical decimation, and outputting a luminance signal Y and chrominance signal C of an ODD field;

an EVEN field generation unit for vertically interpolating an output from the horizontal and vertical interpolation unit and generating an EVEN field; and a multiplexor for multiplexing an ODD field from the horizontal and vertical interpolation unit and an EVEN field from the EVEN field generation unit and outputting an 8-bit luminance signal Y and chrominance signal C.

* * * * *